Nov. 25, 1924.
S. N. ARNOLD ET AL
1,516,838
ANTIFRICTION SUPPORT FOR PIPE LINES
Filed April 27, 1923
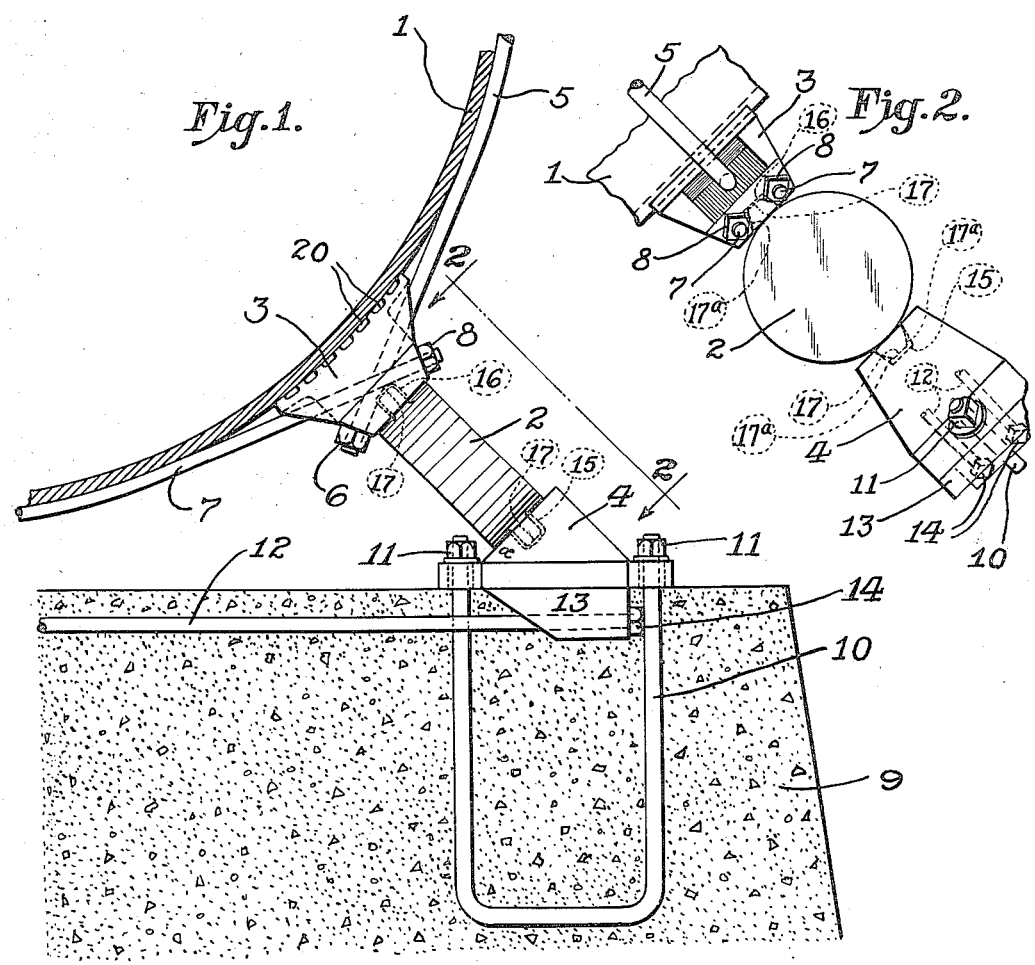
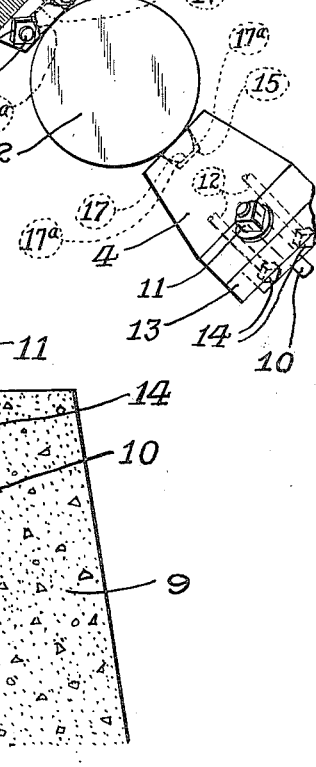
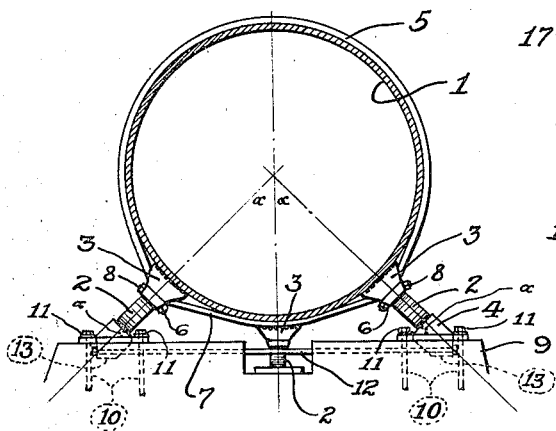
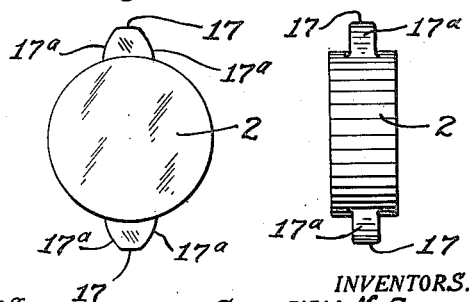
INVENTORS.
STANFIELD N. ARNOLD
FRANCIS E. JOHNSON, JR
BY
Sheffield & Betts
ATTORNEYS.

Patented Nov. 25, 1924.

1,516,838

UNITED STATES PATENT OFFICE.

STANFIELD N. ARNOLD, OF PLAINFIELD, AND FRANCIS E. JOHNSON, JR., OF EAST ORANGE, NEW JERSEY, ASSIGNORS TO THE M. W. KELLOGG COMPANY, A CORPORATION OF DELAWARE.

ANTIFRICTION SUPPORT FOR PIPE LINES.

Application filed April 27, 1923. Serial No. 635,018.

*To all whom it may concern:*

Be it known that we, STANFIELD N. ARNOLD and FRANCIS E. JOHNSON, Jr., citizens of the United States, residing in Plainfield, in the county of Union, State of New Jersey, and East Orange, in the county of Essex, State of New Jersey, respectively, have invented certain new and useful Improvements in Antifriction Supports for Pipe Lines, of which the following is a specification.

Our invention relates to anti-friction supports for pipe lines, and has as one of its objects the provision of an arrangement whereby the weight of pipes and metallic pipe lines may be firmly supported while permitting longitudinal movement of the pipe or the like to accommodate its expansion or contraction due to changes of temperature.

Further objects and advantages of our invention will be apparent to those skilled in the art from the following description taken in connection with the accompanying drawing, in which—

Fig. 1 is a detail view illustrating in cross-section a portion of a large pipe or the like supported according to our invention.

Fig. 2 is a detail view of a portion of the elements appearing in Fig. 1, looking in the direction of the arrows 2—2.

Fig. 3 is a cross-section of a pipe or the like supported according to our invention.

Figs. 4 and 5 are detail views of one of the rollers appearing in Figs. 1, 2 and 3.

According to our invention a pipe or the like is supported on rollers in such a way that the pipe may move to a limited extent in the direction of the axis of the pipe while being supported laterally and vertically against buckling.

According to our invention, moreover, the rollers on which the pipe is supported are secured against working out of line or escaping from the supporting blocks and the arrangement also is such that the parts may be readily adjusted in the field to meet varying conditions.

In the drawing, 1 is a pipe supported upon rollers 2, 2 interposed between saddle blocks 3, 3 secured to pipe 1, and base blocks 4, 4. It is essential that at each point of application of our invention to a pipe or the like that there be two rollers with their attendant saddle and base blocks on opposite sides of the vertical center line of the pipe, so as to support not only the weight of the pipe, but also any tendency to buckle laterally. In the case of very large pipe lines I prefer also to use more than two rollers, the arrangement illustrated in Fig. 3 comprising three rollers, one of which is beneath the center of the pipe. Such additional roller or rollers, however, are preferably omitted unless required by the weight of the pipe being supported.

Saddle blocks 3, 3 are preferably attached to the pipe to be supported in an adjustable manner, and also in one permitting ready assembling and adjustment in the field. We are able to provide for the features just mentioned by an arrangement of rods or strips as illustrated, in which rod 5 extends through a central aperture in one of the lateral saddle blocks 3, and thence up and over the top of the pipe and through a similar aperture in the saddle block on the opposite side of the pipe, the two opposed saddle blocks being adjustably secured to rod 5 by means of nuts 6, 6. The two blocks 3, 3 on opposite sides of the pipe are also connected together by means of a pair of rods or strips 7 passing beneath the pipe 1 and extending through suitable apertures in the saddle blocks 3, 3. Rods or strips 7 are also adjustably connected to the saddle blocks 3, 3 by means of threaded nuts 8, 8. The central saddle block 3 is also secured to pipe 1 by means not illustrated in detail, but preferably by an arrangement of strips similar to that just described.

The base blocks 4, 4 are preferably carried by a suitable foundation 9, which may be of concrete or like material, if desired. It is important that the thrust of the pipe be perpendicular to the surfaces of the blocks 3 and 4, with which the rollers are in contact. This condition is fulfilled when these surfaces are perpendicular to the radius of the pipe through the central plane of the rollers 2, as indicated in Fig. 3. It follows from this that the angles between the active surfaces of the base blocks 4 and the horizontal must be equal to the angles between the radii just mentioned and the vertical at the center of the pipe, these angles being indicated in Fig. 3 of the drawings.

The base or bearing blocks 4, 4 are conveniently secured to the foundation 9 by means of U-bolts 10, 10, these bolts having nuts 11, 11, by which blocks 4 are secured to the bolts 10. The weight of the pipe 1 causes an outward thrust on the outer pair of blocks 4, 4, and this thrust may be conveniently counteracted by means of tie bolts 12 passing through lugs on the lower part of the blocks 4 connected thereto by adjustable threaded nuts, 14, 14.

In order to prevent the rollers 2, 2 from being displaced from the proper position on the blocks 4, 3, I provide the rollers 2 with projecting teeth 17, 17, which lie in recesses 15, 16, respectively, in said blocks, thus readily overcoming any tendency to axial movement of the rollers 2, 2. The recesses 15, 16 are also made short to prevent undue longitudinal movement of the pipe at 1. The sides of the recesses 15 and 16 in the longitudinal direction of pipe 1 are plane, but inclined together in the inward direction, the teeth 17 having recesses 17ª, 17ª designed to roll on the sides of the recesses 15, 15 without friction or binding, to the extent permitted by the length of these recesses in the direction of the length of the pipe.

In order that the saddle blocks 3, 3 may be conveniently fitted to pipe lines in the field so that the blocks 3 may have a bearing against the pipe along the full arc of the blocks and at the same time bring the surface of the blocks in contact with roller 2 perpendicular to the radius at the center of the block, the inner faces of blocks 3, 3 are grooved as indicated at 20, so that these faces of the blocks may be readily chipped down to fit.

It will be seen that a pipe supporting arrangement according to our invention not only reduces the friction of motion while supporting the pipe laterally against buckling, but also eliminates any danger of the rollers getting out of line or escaping, and provides complete flexibility for adjustment in the field to meet varying conditions.

Having thus described our invention, we claim:

1. The combination of a pipe, saddle blocks secured to said pipe on opposite sides of its vertical center line, fixed thrust blocks adjacent said saddle blocks, and a roller intermediate each saddle and thrust block having means engaging both blocks for preventing the roller from escaping therebetween.

2. The combination of a pipe, saddle blocks secured to said pipe on opposite sides of its vertical center line, fixed thrust blocks adjacent said saddle blocks, and a roller intermediate each saddle and thrust block having means engaging both blocks for limiting the rolling movement of said roller therebetween.

3. The combination of a pipe, saddle blocks secured to said pipe on opposite sides of its vertical center line, a fixed thrust block adjacent each saddle block, and a roller intermediate each saddle and thrust block, said blocks being recessed and said rollers having teeth extending into said recesses.

4. The combination of a pipe, saddle blocks secured to said pipe on opposite sides of its vertical center line, fixed thrust blocks adjacent said saddle blocks, rollers intermediate said saddle and thrust blocks, said blocks being recessed and said rollers having teeth extending into said recesses, said teeth having rolling engagement with the sides of said recesses.

5. The combination of a pipe, saddle blocks secured to said pipe on opposite sides of its vertical center line, fixed thrust blocks adjacent said saddle blocks, and rollers intermediate said saddle and thrust blocks having means limiting the rolling movement therebetween, the surfaces of said blocks in contact with said rollers being perpendicular to a line through the center of said pipe and at an angle to its vertical center line.

6. The combination of a pipe, a pair of saddle blocks each of which is adjustably secured to said pipe, a pair of rollers in supporting contact with said blocks, and means supporting the thrust of said rollers.

F. E. JOHNSON, Jr.
S. N. ARNOLD.